(12) United States Patent
Lee et al.

(10) Patent No.: US 9,246,166 B2
(45) Date of Patent: Jan. 26, 2016

(54) COMPOSITE CATHODE ACTIVE MATERIAL, CATHODE AND LITHIUM BATTERY INCLUDING THE COMPOSITE CATHODE ACTIVE MATERIAL, AND PREPARATION METHOD THEREOF

(71) Applicant: Samsung SDI Co., Ltd., Yongin-si, Gyeonggi-Do (KR)

(72) Inventors: Young-Hun Lee, Yongin (KR); Soon-Rewl Lee, Yongin (KR); Na-Ri Park, Yongin (KR); Young-Ki Kim, Yongin (KR); Na-Leum Yoo, Yongin (KR); Ick-Kyu Choi, Yongin (KR); Yong-Chul Park, Yongin (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 121 days.

(21) Appl. No.: 13/896,061

(22) Filed: May 16, 2013

(65) Prior Publication Data
US 2014/0205898 A1   Jul. 24, 2014

(30) Foreign Application Priority Data

Jan. 18, 2013   (KR) .................. 10-2013-0006063

(51) Int. Cl.
*H01M 4/36* (2006.01)
*H01M 4/04* (2006.01)
*H01M 4/1391* (2010.01)

(52) U.S. Cl.
CPC ............ *H01M 4/366* (2013.01); *H01M 4/0402* (2013.01); *H01M 4/1391* (2013.01); *Y02E 60/122* (2013.01)

(58) Field of Classification Search
None
See application file for complete search history.

(56) References Cited

U.S. PATENT DOCUMENTS

| 2004/0200998 A1* | 10/2004 | Park et al. ...................... 252/500 |
| 2005/0260495 A1* | 11/2005 | Onnerud et al. ........... 429/231.1 |
| 2011/0309290 A1 | 12/2011 | Paulsen et al. |
| 2012/0009474 A1* | 1/2012 | Yanagihara et al. .......... 429/219 |

FOREIGN PATENT DOCUMENTS

| JP | 2007-048710 A | 2/2007 |
| JP | 2008-130287 A | 6/2008 |
| KR | 10-2007-0095200 A | 9/2007 |
| KR | 10-2011-0027324 A | 3/2011 |

* cited by examiner

*Primary Examiner* — Patrick Ryan
*Assistant Examiner* — Wyatt McConnell
(74) *Attorney, Agent, or Firm* — Knobbe Martens Olson & Bear LLP

(57) ABSTRACT

In an aspect, a composite cathode active material a cathode and a lithium battery including the composite cathode active material, and a method of preparing the composite cathode active material is disclosed.

16 Claims, 3 Drawing Sheets

COMPOSITE CATHODE ACTIVE MATERIAL, CATHODE AND LITHIUM BATTERY
INCLUDING THE COMPOSITE CATHODE
ACTIVE MATERIAL, AND PREPARATION
METHOD THEREOF

INCORPORATION BY REFERENCE TO
RELATED APPLICATIONS

Any and all priority claims identified in the Application Data Sheet, or any correction thereto, are hereby incorporated by reference under 37 CFR 1.57. For example, this application claims the benefit of Korean Patent Application No. 10-2013-0006063, filed on Jan. 18, 2013, in the Korean Intellectual Property Office, the disclosure of which is incorporated herein in its entirety by reference.

BACKGROUND

1. Field

This disclosure relates to a composite cathode active material, a cathode and a lithium battery including the composite cathode active material, and a preparation method thereof.

2. Description of the Related Technology

High energy density of lithium batteries is desirable for various miniaturized and high performance devices. Also, electrical vehicles require stability of lithium batteries under conditions of high capacity, high temperature, and high voltage.

Various cathode active materials have been examined in order to realize lithium batteries in accordance with the above uses.

Nickel-based lithium transition metal oxide may provide high discharge capacity per unit weight in comparison to typical $LiCoO_2$, but may have low capacity per unit volume due to low packing density. As a result, the nickel-based lithium transition metal oxide in a lithium battery may provide low discharge capacity. Also, the stability of the nickel-based lithium transition metal oxide may be inadequate.

Therefore, a method of improving charge-discharge efficiency, high-rate characteristics, and lifetime characteristics of a lithium battery including nickel-based lithium transition metal oxide by improving the packing density and thermal stability of the nickel-based lithium transition metal oxide is desirable.

SUMMARY

One or more embodiments include a composite cathode active material having a new structure.

One or more embodiments include a cathode including the composite cathode active material.

One or more embodiments include a lithium battery including the cathode.

One or more embodiments include a method of preparing the composite cathode active material.

Additional aspects will be set forth in part in the description which follows and, in part, will be apparent from the description, or may be learned by practice of the presented embodiments.

Some embodiments provide a composite cathode active material includes: a core including nickel-based lithium transition metal oxide; and a single coating layer formed on the core, wherein the single coating layer includes cobalt as a main component.

Some embodiments provide a cathode includes the composite cathode active material.

Some embodiments provide a lithium battery includes the cathode.

Some embodiments provide a method of preparing a composite cathode active material includes: preparing a nickel-based lithium transition metal oxide core particles; attaching nanoparticles of a compound including cobalt to the core to prepare a coated core; and forming a one-body coating layer by heating the coated core at a temperature ranging from about 600° C. to about 900° C. in an air atmosphere.

Some embodiments provide a composite cathode active material including: particles, wherein each particle has a core; and a single coating layer formed on the core of each particle, wherein the single coating layer includes transition metals and the core includes nickel-based lithium transition metal oxide.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
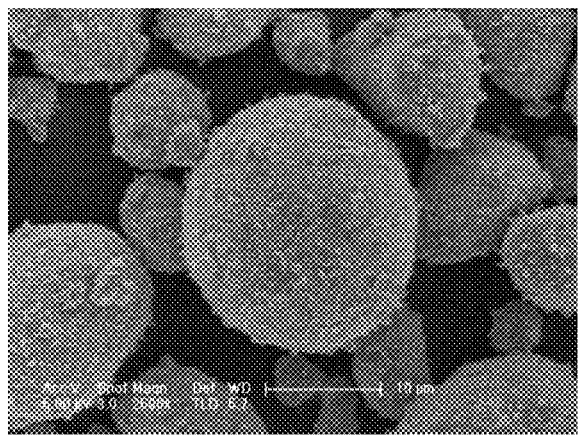
FIG. 1A is a scanning electron microscope (SEM) image of a core coated with $LiCoO_2$ (LCO) nanoparticles in Example 4.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a composite cathode active material, a cathode and a lithium battery including the composite cathode active material, and a preparation method thereof will be described in more detail.

Some embodiments provide a composite cathode active material including particles having a core; and a single coating layer formed on the core, wherein the single coating layer includes cobalt as a main component and said core may include a nickel-based lithium transition metal oxide. In some embodiments, the single coating layer does not denote a discontinuous island-type plurality of coating layers, but denotes a continuous coating layer. In some embodiments, the single coating layer may be a continuous coating layer. In some embodiments, the single coating layer may be a one-body coating layer, in which nanoparticles are connected to one another without boundaries to form a single coating layer.

As used herein, the term "main component" refers to the most abundant component among the transition metals in the coating layer.

In some embodiments, a side reaction between the nickel-based lithium transition metal oxide included in the core and an electrolyte may be prevented by the formation of the single coating layer on the core, and the stability and charge-discharge characteristics of a lithium (Li) battery including the composite cathode active material may be improved by improving the thermal stability and structural stability of the nickel-based lithium transition metal oxide. In some embodiments, the single coating layer may include cobalt as a main component.

In some embodiments, the single coating layer may completely cover the core. In some embodiments, the composite cathode active material may have a core-shell structure as the single coating layer completely covers the core. Stability of the core may be further improved by allowing the core to be completely covered by a shell including cobalt as a main component.

In some embodiments, the content of cobalt among transition metals included in the single coating layer including cobalt as a main component may be about 50% or more. In some embodiments, the content of cobalt among transition metals included in the single coating layer may be about 55% or more. For example, the content of cobalt among transition metals included in the single coating layer may be about 60% or more. Since the cobalt is structurally stable in various oxidation states, the stability of the composite cathode active material may be improved by the existence of the single coating layer including cobalt in an amount of about 50 at % or more. In some embodiments, the content of cobalt among transition metals included in the single coating layer may be from about 55% to about 65%.

In some embodiments, the concentration of cobalt in the composite cathode active material may have a gradient continuously decreasing from the single coating layer to a center of the core of a particle. For example, the concentration of cobalt may be the highest in the single coating layer and the lowest in the center of the core. In some embodiments, the concentration of cobalt may have a continuous gradient in the composite cathode active material by the diffusion of cobalt from the single coating layer to the core during a process of forming the single coating layer. In some embodiments, the cobalt has a concentration profile comprising a substantial decrease within the depth from the surface to 20% of the particle radius.

In some embodiments, a thickness of the single coating layer may be about 100 nm or more. For example, the thickness of the single coating layer may be in a range of about 200 nm to about 1000 nm. In some embodiments, the thickness of the single coating layer may be in a range of about 250 nm to about 900 nm. In some embodiments, the thickness of the single coating layer may be in a range of about 300 nm to about 800 nm. In some embodiments, the thickness of the single coating layer may be in a range of about 400 nm to about 700 nm. In some embodiments, the thickness of the single coating layer may be in a range of about 450 nm to about 600 nm. In the case that the thickness of the single coating layer is excessively low, the effect of coating may be insignificant, and in the case that the thickness of the single coating layer is excessively high, discharge capacity may be relatively reduced. The thickness of the single coating layer may be denoted as a distance up to a position in which a concentration of cobalt is about 50 at % or more from a surface of the composite cathode active material toward a direction of the center of the core. In some embodiments, the depth of the surface of the coating layer may be from about 5 nm to about 100 nm. In some embodiments, the depth of the surface of the coating layer may be from about 5 nm to about 75 nm. In some embodiments, the depth of the surface of the coating layer may be from about 5 nm to about 50 nm. In some embodiments, the depth of the surface of the coating layer may be from about 2 nm to about 40 nm. In some embodiments, the depth of the surface of the coating layer may be from about 5 nm to about 30 nm. In some embodiments, the depth of the surface of the coating layer may be from about 1 nm to about 60 nm. In some embodiments, the depth of the surface of the coating layer may be from about 2 nm to about 50 nm. In some embodiments, the depth of the surface of the coating layer may be from about 5 nm to about 50 nm. In some embodiments, the depth of the surface of the coating layer may be from about 10 nm to about 50 nm. In some embodiments, the depth of the surface of the coating layer may be from about 25 nm to about 50 nm.

In some embodiments, the content of the single coating layer may be in a range of about 5 wt % to about 50 wt % based on a total weight of the composite cathode active material. In the case that the content of the single coating layer is less than about 5 wt %, the single coating layer may not completely cover a surface of the core, and in the case in which the content of the single coating layer is greater than about 50 wt %, discharge capacity may be relatively reduced.

In some embodiments, the core may have a shape of a one-body particle of the nickel-based lithium transition metal oxide. A side reaction at a high voltage is inhibited as the core has the shape of a one-body particle and thus, lifetime characteristics may be improved. Since a specific surface area of the one-body particle may decrease as pores and boundaries between nanoparticles may disappear in comparison to a particle having the form of an agglomerate obtained by agglomeration of nanoparticles, the thermal stability and lifetime characteristics may be improved. That is, the one-body particle may not be a secondary particle formed by the agglomeration of nano-sized primary particles, but may be a single large-sized particle, for example, a micro-sized primary particle.

In some embodiments, density of an electrode plate may increase as the core includes a one-body particle of the nickel-based lithium transition metal oxide, and as a result, discharge capacity per unit volume may increase. In some embodiments, decrease in charge-discharge efficiency may be prevented as the core is further coated with lithium cobalt oxide.

Also, the core may have the form of a secondary particle obtained by the agglomeration of primary particles. In some embodiments, the secondary particle may include pores and boundaries between the primary particles.

Figure 1B:
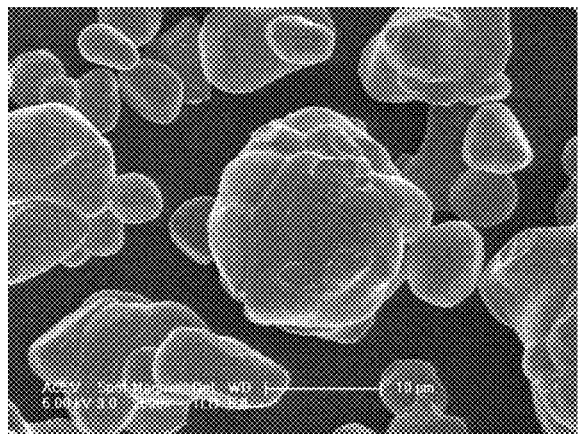
FIG. 1B is a SEM image of a product prepared by heating the core coated with LCO nanoparticles in Example 4.

In some embodiments, the average particle diameter of the core may be in a range of about 5 μm to about 30 μm. In the case that the average particle diameter of the core is excessively small, a material mixture density of an electrode plate may be decreased or the safety of a lithium battery may be decreased. In the case that the average particle diameter of the core is excessively large, the material mixture density thereof may also be decreased or high-rate characteristics may be degraded. In some embodiments, the core may be a one-body particle having an average particle diameter ranging from about 5 μm to about 30 μm. In some embodiments, the single coating layer may be formed by heating a compound including cobalt. In some embodiments, the compound including cobalt may be $Co(OH)_2$, $Co_3O_4$, and CoO. However, the compound including cobalt is not limited thereto and any compound able to be used as a source of cobalt in the art may be used. In some embodiments, the single coating layer may be formed by heating lithium cobalt oxide nanoparticles. For example, as illustrated in FIG. 1a, lithium cobalt oxide nanoparticles are adhered to a core and a single coating layer as shown in FIG. 1b may then be obtained by heating the resulting product. In some embodiments, the lithium cobalt oxide used in the formation of the coating layer may be $LiCoO_2$. However, the lithium cobalt oxide is not limited thereto and other lithium cobalt oxides known in the art may be used.

In some embodiments, the single coating layer may include a solid solution of nickel-based lithium transition metal oxide and lithium cobalt oxide. The lithium cobalt oxide included in the core may exist in the form of a solid solution by being dissolved in the nickel-based lithium transition metal oxide. That is, the single coating layer may not be composed of pure lithium cobalt oxide, but may be composed of a solid solution of the nickel-based lithium transition metal oxide originated from the core and the lithium cobalt oxide. Since the coating layer may be derived from the lithium cobalt oxide, cobalt among transition metals included in the single coating layer may be included as a main component. Meanwhile, the coating layer may not include a region composed of pure lithium cobalt oxide since it may contain other minor components.

Some embodiments provide a composite cathode active material for a rechargeable lithium battery including surface modified metal oxide particles. In some embodiments, the metal oxide particles may be nickel based lithium transition metal oxide.

In some embodiments, the nickel-based lithium transition metal oxide particles may have a bulk formula expressed as the following Chemical Formula 1:

$$Li_xCo_aNi_bM_cO_{2+\alpha} \quad \text{Chemical Formula 1}$$

where $0.9 < x < 1.5$, $0 < a < 0.5$, $0 < b < 1$, $0 < c < 1$, and $-0.1 \leq \alpha \leq 0.1$, M may be at least one element selected from the group consisting of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), manganese (Mn), chromium (Cr), iron (Fe), magnesium (Mg), vanadium (V), and rare earth elements.

In some embodiments, the nickel-based lithium transition metal oxide particles may have a bulk formula expressed as the following Chemical Formula 2:

$$Li_xCo_aNi_bM_cO_{2+\alpha} \quad \text{Chemical Formula 2}$$

where $0.9 < x < 1.1$, $0 < a < 0.5$, $0.4 < b < 1$, $0 < c < 0.5$, and $-0.1 \leq \alpha \leq 0.1$, M may be at least one element selected from the group consisting of Mg, Ca, Sr, Ba, Ti, Zr, Nb, Mo, W, Zn, Al, Si, Mn, Cr, Fe, Mg, V, and rare earth elements.

In some embodiments, the nickel-based lithium transition metal oxide particles may have a bulk formula expressed as the following Chemical Formula 3:

$$Li_xCo_aNi_bMn_cO_{2+\alpha} \quad \text{Chemical Formula 3}$$

where $0.9 < x < 1.1$, $0 < a < 0.5$, $0.4 < b < 1$, $0 < c < 0.5$, and $-0.1 \leq \alpha \leq 0.1$.

A cathode according to another embodiment includes the foregoing composite cathode active material.

As used herein, the term "bulk formula" refers to a chemical formula based on the average elemental content of a quantity of material in the overall mass of the particles rather than in a local mass or portion of the particles. In the bulk formula, the amount of one element is set as the primary integer and the other element(s) amount(s) is/are normalized to that primary integer.

In some embodiments, the cathode includes a current collector; and a cathode active material layer disposed on the current collector, wherein a cathode mixture density of the cathode active material layer may be about 3.8 g/cm³ or more. In some embodiments, the mixture density of the cathode active material layer may be in a range of about 3.8 g/cm³ to about 4.1 g/cm³. In the case that the mixture density is less than about 3.8 g/cm³, high discharge capacity may be difficult to be obtained. In the case that the mixture density is greater than about 4.1 g/cm³, the density thereof may not only be off from a range of density generally obtained, but particles of the active material may be crushed.

As used herein, the term "cathode mixture density" refers to an apparent packing density of a composite cathode active material as compressed with two roller presses having a predetermined line pressure. A method of measuring a cathode mixture density is performed by measuring a density of an electrode plate which is obtained by putting a cathode plate between two adjacent rollers and applying a predetermined pressure thereto.

In some embodiments, the cathode may be prepared by using a method of forming a cathode active material composition including the composite cathode active material and a binder in a predetermined shape or coating a current collector, such as a copper foil or an aluminum foil, with the cathode active material composition.

Specifically, a cathode active material composition is prepared, in which the composite cathode active material, a conductive agent, a binder, and a solvent are mixed. A cathode plate may be prepared by directly coating a metal current collector with the cathode active material composition. Alternatively, the cathode active material composition is casted on a separate support and a cathode plate may then be prepared by laminating a film detached from the support on the metal current collector. The cathode is not limited to the foregoing configurations, and may have other configurations to the foregoing configurations.

In some embodiments, the cathode may further include a typical cathode active material known in the art and including at least one different technical feature, such as a composition or a particle diameter, from that of the foregoing composite cathode active material, in addition to the foregoing composite cathode active material.

In a typical embodiment, one or more selected from the group consisting of lithium cobalt oxide, lithium nickel cobalt manganese oxide, lithium nickel cobalt aluminum oxide, lithium iron phosphorous oxide, and lithium manganese oxide may be included as the cathode active material. However, the cathode active material is not necessarily limited thereto and any cathode active material usable in the art may be further used.

For example, the cathode active material may have a bulk formula expressed as one of the following chemical formulas:

$$Li_aA_{1-b}B^1_bD^1_2 \text{ (where } 0.90 \leq a \leq 1.8, 0 \leq b \leq 0.5);$$

$$Li_aE_{1-b}B^1_bO_{2-c}D^1_c \text{ (where } 0.90 \leq a \leq 1.8, 0 \leq b \leq 0.5, 0 \leq c \leq 0.05);$$

$$LiE_{2-b}B^1_bO_{4-c}D^1_c \text{ (where } 0 \leq b \leq 0.5, 0 \leq c \leq 0.05);$$

$$Li_aNi_{1-b-c}Co_bB^1_cD^1_\alpha \text{ (where } 0.90 \leq a \leq 1.8, 0 \leq b \leq 0.5, 0 \leq c \leq 0.05, 0 < \alpha \leq 2);$$

$$Li_aNi_{1-b-c}Co_bB^1_cO_{2-\alpha}F^1_\alpha \text{ (where } 0.90 \leq a \leq 1.8, 0 \leq b \leq 0.5, 0 \leq c \leq 0.05, 0 < \alpha < 2);$$

$$Li_aNi_{1-b-c}Co_bB^1_cO_{2-\alpha}F^1_2 \text{ (where } 0.90 \leq a \leq 1.8, 0 \leq b \leq 0.5, 0 \leq c \leq 0.05, 0 < \alpha < 2);$$

$$Li_aNi_{1-b-c}Mn_bB^1_cD^1_\alpha \text{ (where } 0.90 \leq a \leq 1.8, 0 \leq b \leq 0.5, 0 \leq c \leq 0.05, 0 < \alpha \leq 2);$$

$Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, $0 < \alpha < 2$);

$Li_aNi_{1-b-c}Mn_bB^1_cO_{2-\alpha}F^1_2$ (where $0.90 \leq a \leq 1.8$, $0 \leq b \leq 0.5$, $0 \leq c \leq 0.05$, $0 < \alpha < 2$);

$Li_aNi_bE_cG_dO_2$ (where $0.90 \leq a \leq 1.8$, $0 \leq b \leq 0.9$, $0 \leq c \leq 0.5$, $0.001 \leq d \leq 0.1$);

$Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$);

$Li_aNiG_bO_2$ (where $0.90 \leq a \leq 1.8$, $0.001 \leq b \leq 0.1$);

$Li_aCoG_bO_2$ (where $0.90 \leq a \leq 1.8$, $0.001 \leq b \leq 0.1$);

$Li_aMnG_bO_2$ (where $0.90 \leq a \leq 1.8$, $0.001 \leq b \leq 0.1$);

$Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A may be Ni, Co, Mn, or a combination thereof; $B^1$ may be Al, Ni, Co, Mn, Cr, Fe, Mg, Sr, V, rare earth elements, or a combination thereof; $D^1$ may be oxygen (O), fluorine (F), sulphur (S), phosphorous (P), or a combination thereof; E may be Co, Mn, or a combination thereof; $F^1$ is fluorine (F), sulphur (S), phosphorous (P), or a combination thereof; G may be Al, Cr, Mn, Fe, Mg, lanthanum (La), cerium (Ce), Sr, V, or a combination thereof; Q may be Ti, Mo, Mn, or a combination thereof; $I^1$ may be Cr, V, Fe, scandium (Sc), yttrium (Y), or a combination thereof; J may be V, Cr, Mn, Co, Ni, copper (Cu), or a combination thereof.

In some embodiments, any one of the foregoing compounds may be used as a component of a coating layer material, or a coating layer material may be made by mixing the foregoing compounds. In some embodiments, the coating layer may include an oxide, hydroxide, oxyhydroxide, oxycarbonate, or hydroxycarbonate of a coating layer material. In some embodiments, the coating layer material may be amorphous or crystalline. Examples of the coating material included in the coating layer may be Mg, Al, Co, potassium (K), sodium (Na), Ca, Si, Ti, V, tin (Sn), germanium (Ge), gallium (Ga), boron (B), arsenic (As), Zr, and combinations thereof. Any coating method may be used for a process of forming a coating layer so long as coating may be performed by using a method (e.g., spray coating, dipping, etc.) that does not adversely affect the physical properties of the cathode active material due to using such coating layer materials on the foregoing compounds.

In some embodiments, the coating layer material may be $LiNiO_2$, $LiCoO_2$, $LiMn_xO_{2x}$ (x=1, 2), $LiNi_{1-x}Mn_xO_2$ ($0<x<1$), $LiNi_{1-x-y}Co_xMn_yO_2$ ($0 \leq x \leq 0.5$, $0 \leq y \leq 0.5$), $LiFeO_2$, $V_2O_5$, TiS, or MoS.

In some embodiments, carbon black and fine graphite particles may be used as the conductive agent. However, the conductive agent is not limited thereto and any conductive agent may be used as long as it is used in the art. Examples of the conductive agent may be graphite such as natural graphite or artificial graphite, carbon black such as acetylene black, Ketjen black, channel black, furnace black, lamp black, or thermal black, conductive fibers such as carbon fibers or metal fibers, metal powder such as fluorocarbon powder, aluminium powder, or nickel powder, conductive whiskers such as zinc oxide or potassium titanate, conductive metal oxide such as titanium oxide, and a conductive material such as a ployphenylene derivative, etc.

Examples of the binder may be vinylidene fluoride/hexafluoropropylene copolymer, polyvinylidene fluoride (PVDF), polyacrylonitrile, poly(methyl methacrylate), polytetrafluoroethylene, and mixtures thereof, or styrene butadiene rubber-based polymer, etc. However, the binder is not limited thereto and any binder may be used as long as it is used in the art.

Examples of the solvent may be N-methylpyrrolidone, acetone, water, etc. However, the solvent is not limited thereto and any solvent may be used as long as it is used in the art.

Contents of the composite cathode active material, the conductive agent, the binder, and the solvent are at amounts typically used in a lithium battery. One or more of the conductive agent, binder, and solvent may be omitted according to applications and configurations of lithium batteries.

Some embodiments provide a lithium battery including a cathode, wherein said cathode includes the composite cathode active material. In some embodiments, the lithium battery may be prepared according to the following method:

First, a cathode is prepared according to the foregoing method of preparing a cathode.

Next, an anode active material, a conductive agent, a binder, and a solvent are mixed to prepare an anode active material composition. An anode plate may be prepared by directly coating and drying the anode active material composition on a metal current collector. Alternatively, the anode active material composition is casted on a separate support and an anode plate may then be prepared by laminating a film detached from the support on the metal current collector.

The anode active material is not particularly limited and any anode active material generally used in the art may be used. More particularly, lithium metal, a metal alloyable with lithium, transition metal oxide, transition metal sulfide, a material able to dope and undope lithium, a material able to reversibly insert and extract lithium ions, and a conductive polymer may be used.

Examples of the transition metal oxide may be tungsten oxide, molybdenum oxide, titanium oxide, lithium titanium oxide, vanadium oxide, and lithium vanadium oxide. For example, the transition metal oxide may be a group I metal containing compound such as CuO, $Cu_2O$, $Ag_2O$, CuS, and $CuSO_4$, a group IV metal containing compound such as $TiS_2$ and SnO, a group V metal containing compound such as $V_2O_5$, $V_6O_{12}$, $VO_x$ ($0<x<6$), $Nb_2O_5$, $Bi_2O_3$, and $Sb_2O_3$, a group VI metal containing compound such as $CrO_3$, $Cr_2O_3$, $MoO_3$, $MoS_2$, $WO_3$, and $SeO_2$, a group VII metal containing compound such as $MnO_2$ and $Mn_2O_3$, a group VIII metal containing compound such as $Fe_2O_3$, FeO, $Fe_3O_4$, $Ni_2O_3$, NiO, $CoO_3$, and CoO, and a compound expressed as a bulk formula such as $Li_xMN_yX_2$ (where M and N are group I to VIII metals, X is oxygen or sulphur, $0.1 \leq x \leq 2$, $0 \leq y \leq 1$), for example, lithium titanate such as $Li_yTiO_2$ ($0 \leq y \leq 1$), $Li_{4+y}Ti_5O_{12}$ ($0 \leq y \leq 1$), and $Li_{4+y}Ti_{11}O_{20}$ ($0 \leq y \leq 1$).

Examples of the composite cathode active material able to dope and undope lithium may be Si, $SiO_x$ ($0<x<2$), a Si—Y alloy (where Y is alkaline metal, alkaline earth metal, a group 13 element, a group 14 element, transition metal, a rare earth element, or a combined element thereof, and is not Si), Sn, $SnO_2$, and a Sn—Y alloy (where Y is alkaline metal, alkaline earth metal, a group 13 element, a group 14 element, transition metal, a rare earth element, or a combined element thereof, and is not Sn), and a mixture of at least one thereof and $SiO_2$ may also be used. Examples of the element Y may be Mg, Ca, Sr, Ba, radium (Ra), Sc, Y, Ti, Zr, hafnium (Hf), rutherfordium (Rf), V, Nb, tantalum (Ta), dubnium (Db), Cr, Mo, W, seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, Sn, indium (In), Ge, P, As, antimony (Sb), bismuth (Bi), S, selenium (Se), tellurium (Te), polonium (Po), and combinations thereof. In some embodiments, element Y may be Mg, Ca, Sr, Ba, radium (Ra), Sc, Y, Ti, Zr, Cr, Mo, W, Fe, lead (Pb), ruthenium (Ru), osmium (Os), rhodium (Rh), iridium (Ir), palladium (Pd), platinum (Pt), Cu, silver (Ag), gold (Au), Zn, cadmium (Cd), B, Al, Ga, Sn, indium (In), Ge, P, As, antimony (Sb), bismuth (Bi), S, selenium (Se), or tellurium (Te).

The composite cathode active material able to reversibly insert and extract lithium ions is a carbon-based material and any carbon-based anode active material generally used in a lithium battery may be used. For example, crystalline carbon, amorphous carbon, or a mixture thereof may be used. The crystalline carbon, for example, may be shapeless, plate, flake, spherical, or fibrous natural graphite, or artificial graphite, and the amorphous carbon, for example, may be soft carbon (low-temperature fired carbon) or hard carbon, mesophase pitch carbide, fired coke, etc.

In some embodiments, the conductive polymer may be a disulfide, polypyrrole, polyaniline, polyparaphenylene, polyacetylene, or a polyacene-based material.

The conductive agent, binder, and solvent in the anode active material composition may be used the same as those in the cathode active material composition. Pores in the electrode plate may also be formed by further adding a plasticizer to the cathode active material composition and/or the anode active material composition.

Contents of the anode active material, conductive agent, binder, and solvent are at amounts typically used in a lithium battery. One or more of the conductive agent, binder, and solvent may be omitted according to applications and configurations of lithium batteries.

Next, a separator, which will be inserted between the cathode and the anode, is prepared. Any separator that is typically used in a lithium battery may be used as the separator. The separator having high moisture-retention ability for an electrolyte as well as low resistance to the transfer of electrolyte ions may be used. Examples of the separator may be one selected from the group consisting of glass fibers, polyester, polyethylene, polypropylene, polytetrafluoroethylene (PTFE), and combinations thereof. The separator may be a non-woven or woven fabric type. For example, a windable separator, such as polyethylene or polypropylene, may be used in a lithium-ion battery, and a separator having high moisture-retention ability for an organic electrolyte may be used in a lithium-ion polymer battery. For example, the separator may be prepared according to the following method:

In some embodiments, a separator composition may be prepared by mixing polymer resin, a filler and a solvent. In some embodiments, the separator composition may be directly coated on an upper portion of an electrode and dried to form a separator. Also, the separator composition is casted and dried on a support, and then a separator may be prepared by laminating a separator film detached from the support on the upper portion of the electrode.

The polymer resin used in the preparation of the separator is not particularly limited and any material used in a binder for an electrode plate may be used. Examples of the polymer resin may be vinylidene fluoride/hexafluoropropylene copolymer, PVDF, polyacrylonitrile, polymethyl methacrylate, or a mixture thereof.

Next, an electrolyte is prepared.

For example, the electrolyte may be an organic electrolyte. In some embodiments, the organic electrolyte may be prepared by dissolving a lithium salt in an organic solvent.

Any organic solvent may be used so long as it is used as an organic solvent in the art. Examples of the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, or a mixture thereof.

Any lithium salt may be used so long as it is used as a lithium salt in the art. Examples of the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, or a mixture thereof.

Also, the electrolyte may be a solid electrolyte such as an organic solid electrolyte and an inorganic solid electrolyte. In the case that a solid electrolyte is used, the solid electrolyte may also be used as a separator.

Examples of the organic solid electrolyte may be a polyethylene derivative, a polyethylene oxide derivative, a polypropylene oxide derivative, a phosphate ester polymer, poly agitation lysine, polyester sulphide, polyvinyl alcohol, polyvinylidene fluoride, and a polymer containing an ionic dissociation group.

The inorganic solid electrolyte, for example, may be boron oxide, lithium oxynitride, etc. However, the inorganic solid electrolyte is not limited thereto and any electrolyte that is used as a solid electrolyte in the art may be used. In some embodiments, the solid electrolyte may be formed on the anode by using a method such as sputtering. For example, nitrides, halides and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$, may be used.

Figure 4:
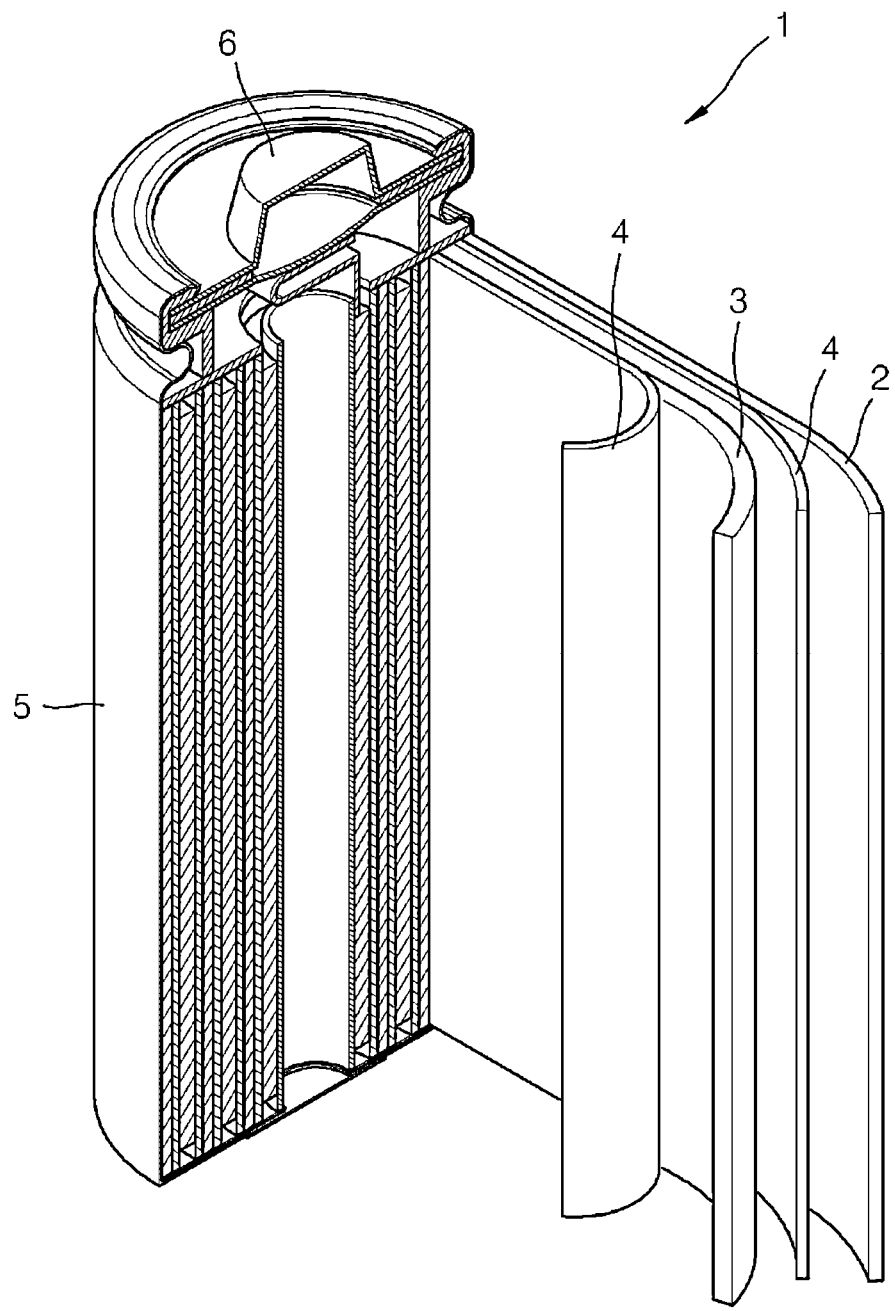
FIG. 4 is a schematic view illustrating a lithium battery according to an embodiment of the present invention.

As shown in FIG. 4, a lithium battery 1 includes a cathode 3, an anode 2, and a separator 4. In some embodiments, the cathode 3, the anode 2 and the separator 4 may be wound and folded to be contained in a battery case 5. In some embodiments, an organic electrolyte solution may be subsequently injected into the battery case 5 and the lithium battery 1 may be completed by being sealed with a cap assembly 6. In some embodiments, the battery case 5 may be a cylindrical, rectangular, or thin-film type. For example, the lithium battery 1 may be a thin-film type battery. In some embodiments, the lithium battery 1 may be a lithium-ion battery.

A separator is disposed between a cathode and an anode such that a battery structure may be formed. In some embodiments, the battery structure may be stacked in a bi-cell structure, and then impregnated in an organic electrolyte solution. In some embodiments, a lithium-ion polymer battery may be completed when a product thus obtained is contained in a pouch and sealed.

In some embodiments, the plurality of battery structures may be stacked to form a battery pack connected in series, and the battery pack may be used in all devices demanding high capacity and high power. For example, the battery pack may be used in notebooks, smartphones, electric power tools, or electric vehicles.

Particularly, since the lithium battery has excellent high-temperature cycle characteristics and high-temperature stability, it is suitable for medium and large sized energy storage devices. For example, the lithium battery is suitable for a power source of an electric vehicle. For example, the lithium battery is suitable for a power source of a hybrid electric vehicle such as a plug-in hybrid electric vehicle (PHEV).

A method of preparing a composite cathode active material according to another embodiment includes: preparing a nickel-based lithium transition metal oxide core; preparing a core coated with nanoparticles by attaching nanoparticles of a compound including cobalt to the core; and forming a one-body coating layer by heating the core coated with nanoparticles at a temperature ranging from about 600° C. to about 900° C. in an air atmosphere.

In embodiments where the heating temperature is less than about 600° C. in the forming of the one-body coating layer, a one-body coating layer may not be formed on a surface of the core, and where the heating temperature is greater than about 900° C., cobalt may completely diffuse into the inside of the core, and thus, a coating layer including cobalt as a main component may not be formed.

In some embodiments, the forming of the one-body coating layer may be performed at a temperature ranging from about 700° C. to about 800° C. in an air atmosphere for about 5 hours to about 10 hours.

In some embodiments, an amount of the nanoparticles in the core coated with nanoparticles may be in a range of about 5 wt % to about 30 wt % based on a total weight of the core coated with nanoparticles. In some embodiments, an amount of the nanoparticles of the compound including cobalt attached to the core in the preparing of the core coated with nanoparticles may be in a range of about 5 wt % to about 30 wt % based on a total weight of the core coated with nanoparticles. In the case that the content of the nanoparticles is less than about 5 wt %, the coating layer may not completely cover the surface of the core, and in the case in which the content of the nanoparticles is greater than about 30 wt %, discharge capacity may be relatively reduced.

In some embodiments, the preparing of the nickel-based lithium transition metal oxide core particles may include: mixing a nickel-based transition metal oxide precursor and a lithium precursor to prepare a mixture; and heating the mixture at a temperature ranging from about 800° C. to about 1000° C. in an air atmosphere for about 10 hours to about 20 hours. In some embodiments, a core in the form of a one-body particle may be obtained by the heating.

In some embodiments, the nickel-based transition metal oxide precursor may be prepared by co-precipitation of a nickel precursor and precursors of other transition metals. For example, the nickel-based transition metal oxide precursor may be hydroxide including nickel and other metals.

For example, a source of cobalt, one of the other metals, may be one or more selected from the group consisting of $Co_3O_4$, $Co(OH)_2$, and $CoO$. However, the source of cobalt is not necessarily limited thereto and any source of cobalt usable in the art may be used.

In the preparation method, the lithium precursor may be $Li_2CO_3$ and LiOH. However, the lithium precursor is not necessarily limited thereto and any lithium precursor usable in the art may be used.

In the preparation method, a method of attaching the nanoparticles of the compound including cobalt to the core may be performed by using a wet or dry method. The method is not particularly limited so long as it may attach nanoparticles to the core. However, all wet or dry methods known in the art, such as mechanical milling and co-precipitation, may be used. In some embodiments, the compound including cobalt may be one or more selected from the group consisting of $Co_3O_4$, $Co(OH)_2$, and $CoO$. However, the compound including cobalt is not necessarily limited thereto and any compound including cobalt usable in the art may be used.

The present embodiments will be described in more detail, according to the following examples and comparative examples. However, the following examples are merely presented to exemplify the present embodiments, and the scope of the present embodiments is not limited thereto.

EXAMPLES

Preparation Section

Preparation of Composite Cathode Active Material

Comparative Example 1

Commercial 523 Lithium Nickel Cobalt Manganese Oxide (NCM)

$Li[Ni_{0.5}Co_{0.2}Mn_{0.3}]O_2$ (Samsung SDI, sample name N11C) having an average particle diameter of about 15 μm was obtained as it is and used as a cathode active material.

Comparative Example 2

One-Body NCM without Coating Layer $NiSO_4(H_2O)_6$ as a nickel precursor, $CoSO_4$ as a cobalt precursor, and $MnSO_4 \cdot H_2O$ as a manganese precursor were added to water at a molar ratio of 50:20:30 to prepare a precursor aqueous solution. The precursor aqueous solution was neutralized by slowly dispensing a sodium hydroxide aqueous solution while stirring the aqueous solution to precipitate $Ni_{0.5}Co_{0.2}Mn_{0.3}(OH)_2$. This precipitate was filtered, washed, and dried at about 80° C. to prepare $Ni_{0.5}Co_{0.2}Mn_{0.3}(OH)_2$ powder having an average particle diameter of about 13 μm.

The $Ni_{0.5}Co_{0.2}Mn_{0.3}(OH)_2$ powder and $Li_2CO_3$ as a lithium precursor were prepared in a molar ratio of 1:0.505.

The prepared precursors were mixed, and a mixture was then put in a furnace and heated at about 1000° C. for about 20 hours while blowing dry air to thus prepare a cathode active material.

The prepared cathode active material was $Li[Ni_{0.5}Co_{0.2}Mn_{0.3}]O_2$, and an average particle diameter of a primary particle, a one-body particle of the cathode active material thus obtained, was about 15 μm.

Example 1

NCM Commercial Core Coated with 5 Wt % LCO $Li_2CoO_2$ (LCO) nanoparticles were added in an amount of about 5 parts by weight to an ethanol solvent and dispersed, and about 95 parts by weight of the $Li[Ni_{0.5}Co_{0.2}Mn_{0.3}]O_2$ particles (NCM core) prepared in Comparative Example 1 were added and stirred at about 1000 rpm for about 10 minutes to prepare a slurry. The slurry was dried at about 150° C. by using a vacuum rotary evaporator.

The dried product (product having an NCM core coated with LCO nanoparticles) was put in a furnace and heated at a temperature ranging from about 700° C. to about 900° C. for about 5 hours while blowing dry air to thus prepare a composite cathode active material.

An average particle diameter of the obtained composite cathode active material having a one-body coating layer formed therein was about 15 μm.

Example 2

A composite cathode active material was prepared in the same manner as Example 1 except that contents of reactants were changed so as to allow 80 parts by weight of NCM cores to be coated with 20 parts by weight of LCO nanoparticles.

Example 3

A composite cathode active material was prepared in the same manner as Example 1 except that contents of reactants were changed so as to allow 60 parts by weight of NCM cores to be coated with 40 parts by weight of LCO nanoparticles.

Example 4

One-Body NCM Core Coated with 5 Wt % LCO

A composite cathode active material was prepared in the same manner as Example 1 except that the NCM core prepared in Comparative Example 2 was used.

FIG. 1A shows a SEM image of dried product (product having an NCM core coated with LCO nanoparticles). FIG. 1B shows a SEM image of heated product of the dried product.

Example 5

A composite cathode active material was prepared in the same manner as Example 2 except that the NCM core prepared in Comparative Example 2 was used.

Example 6

A composite cathode active material was prepared in the same manner as Example 3 except that the NCM core prepared in Comparative Example 2 was used.

Fabrication Section

Preparation of Cathode and Lithium Battery: Coin Half-Cell

Example 7

Composite cathode active material powder synthesized in Example 1 and a carbon conductive agent (Super P, 3M, Minneapolis, Minn.) were uniformly mixed at a weight ratio of 97:1.5 and a PVDF binder solution was then added to prepare an active material slurry having a weight ratio of active material:carbon conductive agent:binder of 97:1.5:1.5. An aluminum current collector having a thickness of about 15 µm was coated with the slurry to a thickness of about 110 µm by using a doctor blade, and the aluminum current coated collector was dried at about 120° C. for about 3 hours or more and then pressed to prepare a cathode plate having a thickness of about 120 µm.

A 2016-type coin cell was prepared by using the cathode plate, lithium as a counter electrode, a polyethylene separator (STAR 20, Asahi Kasei, Tokyo Japan), and a solution, in which about 1.3 M $LiPF_6$ was dissolved in ethylene carbonate (EC)+ethylmethyl carbonate (EMC)+dimethyl carbonate (DMC) (volume ratio of 3:3:4), as an electrolyte.

Examples 8 to 12

2016-type coin cells were prepared in the same manner as Example 7 except that the composite cathode active materials prepared in Examples 2 to 6 were respectively used instead of using the composite cathode active material prepared in Example 1.

Comparative Examples 3 and 4

2016-type coin cells were prepared in the same manner as Example 7 except that the composite cathode active materials prepared in Comparative Examples 1 and 2 were used instead of using the composite cathode active material prepared in Example 1.

Preparation of Cathode and Lithium Battery: Full Cell

Example 13

Composite cathode active material powder synthesized in Example 1 and a carbon conductive agent (Super P) were uniformly mixed at a weight ratio of 97:1.5 and a PVDF binder solution was then added to prepare an active material slurry having a weight ratio of active material:carbon conductive agent:binder of 97:1.5:1.5. Both sides of an aluminum current collector having a thickness of about 15 µm were coated with the active material slurry to a thickness of about 120 µm per side by using a doctor blade, and the coated aluminum current collector was dried at about 120° C. for about 3 hours or more and then pressed to prepare a cathode having a thickness of about 120 µm (in half thickness).

Graphite particles (CISR, Nippon Carbon Co., LTD, Tokyo Japan) having an average particle diameter of about 25 µm and a second mixture, in which styrene butadiene rubber (SBR) and carboxymethyl cellulose (CMC) were mixed at a weight ratio of 1:1, as a binder, were mixed at a weight ratio of 98:2 to prepare an anode active material slurry.

A copper foil current collector having a thickness of about 10 µm was coated with the prepared anode active material slurry to a level of about 9 mg/cm². The coated electrode plate was dried at about 120° C. for about 3 hours or more and then pressed to prepare an anode having a thickness of about 100 µm.

The cathode, the anode, a polyethylene (STAR 20, Asahi) separator, and a solution, in which about 1.15 M $LiPF_6$ was dissolved in a mixed solvent of EC:EMC:DMC (volume ratio of 3:3:4), as an electrolyte were wound to have a predetermined size, and a pouch cell was then prepared through a cell assembly process.

Examples 14 to 18

Lithium batteries were prepared in the same manner as Example 13 except that the composite cathode active materials prepared in Examples 2 to 6 were respectively used.

Comparative Examples 5 and 6

Lithium batteries were prepared in the same manner as Example 13 except that the composite cathode active materials prepared in Comparative Examples 1 and 2 were used.

Analysis Section

Evaluation Example 1

SEM and EDX Analysis

An SEM image of a cross section of a composite cathode active particle prepared in Example 4 was obtained and energy dispersive X-ray spectroscopy (EDX) analysis was performed thereon to measure a concentration of cobalt according to a position of the composite cathode active particle, and some of the results thereof are presented below in Table 1 and FIG. 2. The EDX analysis was performed by using an FEI Sirion SEM EDX.

TABLE 1

|   | Ni content [at %] | Co content [at %] | Mn content [at %] |
|---|---|---|---|
| 1 | 50.94 | 19.98 | 29.08 |
| 2 | 47.43 | 24.41 | 28.16 |
| 3 | 29.02 | 60.52 | 10.46 |

Figure 2:
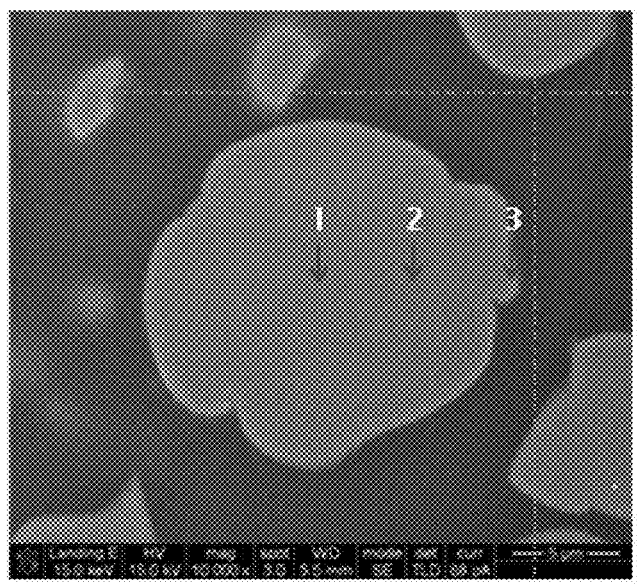
FIG. 2 is a SEM image of a cross section of a composite cathode active material particle prepared in Example 4.

According to the results of EDX analysis on atomic percentages of transition metals for positions 1 (near the center of the core), 2 (near the midpoint of the center of the core and the surface), and 3 (near the surface) of the cross section of the composite cathode active material shown in FIG. 2, a content of cobalt in a coating layer at position 3 was about 60 at %, a content of cobalt in the center of the composite cathode active material particle at position 1 was about 20 at %, and a content of cobalt at position 2 between the above positions was about 24 at %.

Therefore, it may be understood that the composite cathode active material particle had a continuous concentration gradient of cobalt in which the concentration of cobalt was the highest at the coating layer and gradually decreased toward the center of the particle.

A thickness of the coating layer was about 500 nm.

Evaluation Example 2 pH Measurement pHs of the composite cathode active materials prepared in Examples 1 to 6 and Comparative Examples 1 and 2 were measured and the results thereof are presented in Table 2 below.

About 2 g of each composite active material was added to about 100 g of pure water and stirred, and a pH of each slurry was then measured by using a pH meter (PHS-3C PH Meter, HINOTEK).

As illustrated in Table 2, the pHs of the composite cathode active materials of Examples having coating layers formed thereon were lower than those of the composite cathode active materials of corresponding Comparative Examples having no coating layers.

A decrease in pH of the composite cathode active material denotes a decrease in a content of Li remaining on the surface of the composite cathode active material. Therefore, in the case of preparing an electrode plate by using the composite cathode active material, stable coating may be possible due to the improvement of the stability of the active material slurry, and the degradation of cell characteristics may be prevented due to a decrease in side reactions in the cell.

Evaluation Example 3

Measurement of Residual Lithium

Composite cathode active material powders prepared in Examples 1 to 6 and Comparative Examples 1 and 2 were dissolved in water and titrated with hydrochloric acid to calculate contents of LiOH and $Li_2CO_3$ in the composite cathode active material powders, and contents of lithium (calculated from the contents of LiOH) remaining on surfaces of lithium transition metal oxides were calculated and the results thereof are presented in the following Table 2.

TABLE 2

|   | pH | Residual lithium [ppm] |
|---|---|---|
| Comparative Example 1 | 11.21 | 260 |
| Example 1 | 11.15 | 220 |
| Example 2 | 10.82 | 165 |
| Example 3 | 10.71 | 150 |
| Comparative Example 2 | 10.65 | 170 |
| Example 4 | 10.52 | 145 |
| Example 5 | 10.33 | 120 |
| Example 6 | 10.27 | 110 |

As illustrated in Table 2, the contents of residual lithium of the composite cathode active materials of Examples having coating layers formed thereon were lower than those of the composite cathode active materials of corresponding Comparative Examples having no coating layers, and thus, the possibility of having side reactions with the electrolyte was reduced.

Evaluation Example 4

Measurement of Cathode Mixture Density

Mixture densities of cathode having a cathode active material layer included in the cathode plates prepared in Examples 7 to 12 and Comparative Examples 3 and 4 were measured and the results thereof are presented in Table 3 below.

The mixture density of each cathode was calculated by measuring the volume and weight of an electrode plate which was obtained by putting an electrode plate coated with a cathode active material layer between two adjacent rollers and pressing with a predetermined pressure.

TABLE 3

|   | Mixture density of cathode [g/cm$^3$] |
|---|---|
| Example 7 | 3.45 |
| Example 8 | 3.53 |
| Example 9 | 3.61 |
| Example 10 | 3.80 |
| Example 11 | 3.86 |
| Example 12 | 3.92 |
| Comparative Example 3 | 3.42 |
| Comparative Example 4 | 3.73 |

As illustrated in Table 3, the cathode plates of Examples 7 to 12 exhibited improved material mixture densities in comparison to the cathode plates of Comparative Examples 3 and 4. The improved mixture density of the cathode may improve the capacity of a lithium battery.

Results Section

Evaluation Example 5

Evaluation of Charge-Discharge Characteristics of Half Cell

Constant-current charge was performed on the lithium batteries subjected to a formation operation at about a 0.1 C rate at 25° C. until a voltage reached about 4.45 V (vs. Li), and constant-voltage charge was performed until a current reached about 0.01 C while the voltage was maintained at about 4.45 V. Subsequently, constant-current discharge was performed at about 0.2 C until the voltage reached about 3.0 V (vs. Li) during the discharge (first cycle).

Thereafter, constant-current charge was performed on the lithium batteries at about a 1.0 C rate at 25° C. until the voltage reached about 4.45 V (vs. Li), and constant-voltage charge was performed until the current reached about 0.01 C while the voltage was maintained at about 4.45 V. Subsequently, constant-current discharge was performed at about 1.0 C until the voltage reached about 3.0 V (vs. Li) during the discharge (second cycle).

Some of the results of the charge-discharge experiments are presented in Table 4 below. Charge-discharge efficiency and high-rate characteristics are expressed as the following Equations 1 and 2.

$$\text{Charge-discharge efficiency [\%]} = [\text{discharge capacity/charge capacity}] \times 100 \quad \text{EQUATION 1}$$

$$\text{High-rate characteristics [\%]} = [1C \text{ (second cycle) discharge capacity}/0.2C \text{ (first cycle) discharge capacity}] \times 100 \quad \text{EQUATION 2}$$

TABLE 4

| | Charge capacity in the $1^{st}$ cycle [mAh/g] | Discharge capacity in the $1^{st}$ cycle [mAh/g] | Charge-discharge efficiency in the $1^{st}$ cycle [%] | High-rate characteristics [%] |
|---|---|---|---|---|
| Comparative Example 3 | 214 | 190 | 89 | 93 |
| Example 7 | 212 | 191 | 90 | 93 |
| Example 8 | 212 | 194 | 92 | 94 |
| Example 9 | 210 | 196 | 93 | 95 |
| Comparative Example 4 | 212 | 180 | 85 | 91 |
| Example 10 | 211 | 185 | 87 | 91 |
| Example 11 | 210 | 188 | 89 | 92 |
| Example 12 | 211 | 192 | 91 | 93 |

As illustrated in Table 4, the lithium batteries of Examples 7 to 9 exhibited improved charge-discharge characteristics and high-rate characteristics in comparison to the lithium battery of Comparative Example 3, and the lithium batteries of Examples 10 to 12 exhibited improved charge-discharge characteristics and high-rate characteristics in comparison to the lithium battery of Comparative Example 4.

Evaluation Example 6

Lifetime Characteristics Test of Full Cell

Constant-current charge was performed on the pouch cells prepared in Examples 13 to 18 and Comparative Examples 5 and 6 at about 0.2 C rate at 25° C. until a voltage reached about 4.3 V, and constant-voltage charge was performed until a current reached about 0.05 C while the voltage was maintained at about 4.3 V. Subsequently, constant-current discharge was performed at about 0.2 C until the voltage reached about 3.0 V during the discharge (formation operation).

Thereafter, constant-current charge was performed on the pouch cells at about 0.5 C rate until the voltage reached about 4.3 V, and constant-voltage charge was performed until the current reached about 0.05 C while the voltage was maintained at about 4.3 V. Subsequently, constant-current discharge was performed at about 0.2 C until the voltage reached about 3.0 V during the discharge (standard operation).

Constant-current charge was performed on the lithium batteries subjected to the formation and standard operations at about a 0.5 C rate at 25° C. until the voltage reached about 4.3 V, and constant-voltage charge was performed until the current reached about 0.05 C while the voltage was maintained at about 4.3 V. Subsequently, a cycle of discharging at a constant current of about 0.5 C until the voltage reached about 3.0 V during the discharge was repeated 300 times.

Some of the results of the charge-discharge experiments are presented in Table 5 below and FIG. 3. A capacity retention ratio is expressed as the following Equation 3.

$$\text{Capacity retention ratio [\%]} = [\text{discharge capacity in a } 300^{th} \text{ cycle/discharge capacity in the } 1^{st} \text{ cycle}] \times 100 \quad \text{EQUATION 3}$$

TABLE 5

| | Capacity retention ratio in a $300^{th}$ cycle [%] | Discharge capacity in a $300^{th}$ cycle [mAh] |
|---|---|---|
| Example 13 | 85 | 1530 |
| Example 14 | 88 | 1584 |
| Example 15 | 91 | 1640 |
| Example 16 | 91 | 1638 |
| Example 17 | 94 | 1692 |
| Example 18 | 96 | 1728 |
| Comparative Example 5 | 82 | 1476 |
| Comparative Example 6 | 90 | 1600 |

Figure 3:
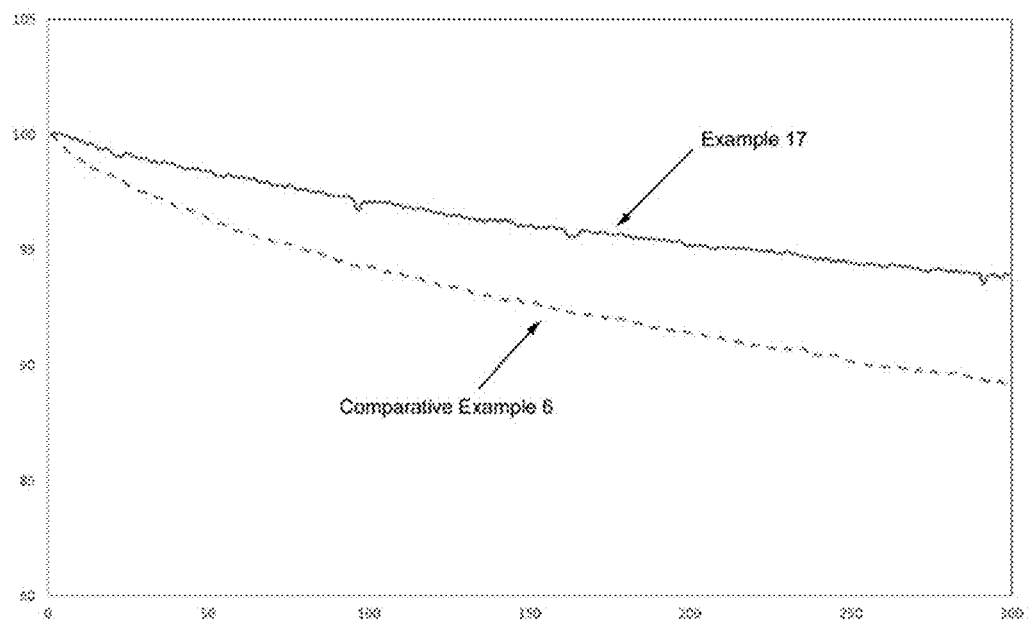
FIG. 3 illustrates the results of experiments on lifetime characteristics of lithium batteries prepared in Example 17 and Comparative Example 6.

As illustrated in Table 5 and FIG. 3, the lithium batteries of Examples 13 to 18 exhibited improved lifetime characteristics in comparison to the lithium batteries of Comparative Examples 5 and 6.

Evaluation Example 7

Stability Evaluation of Full Cell

Stabilities to impact, short circuit, penetration, heat exposure, and overcharge were evaluated for the coin cells prepared in Examples 13 to 18 and Comparative Examples 5 and 6.

○: relatively very good stabilities to impact, short circuit, penetration, heat exposure, and overcharge Δ: relatively good stabilities to impact, short circuit, penetration, heat exposure, and overcharge X: relatively poor stabilities to impact, short circuit, penetration, heat exposure, and overcharge The results of the evaluation are presented in Table 6.

TABLE 6

| | Impact | Short circuit | Penetration | Heat exposure | Overcharge |
|---|---|---|---|---|---|
| Comparative Example 5 | X | X | X | X | X |
| Example 13 | X | Δ | X | Δ | X |
| Example 14 | Δ | ○ | Δ | Δ | X |
| Example 15 | ○ | ○ | ○ | ○ | Δ |
| Comparative Example 6 | Δ | Δ | Δ | Δ | X |
| Example 16 | Δ | Δ | Δ | ○ | Δ |
| Example 17 | ○ | ○ | ○ | ○ | ○ |
| Example 18 | ○ | ○ | ○ | ○ | ○ |

As illustrated in Table 6, stabilities of the lithium batteries of Examples 13 to 18 were improved in comparison to those of the lithium batteries of Comparative Examples 5 and 6.

As described above, according to the one or more of the above embodiments of the present invention, the stability, charge-discharge efficiency, high-rate characteristics, and lifetime characteristics of a lithium battery may be improved by including a composite cathode active material, in which a single coating layer including cobalt as a main component is formed on a core including nickel-based lithium transition metal oxide.

In the present disclosure, the terms "Example," "Comparative Example" and "Evaluation Example" are used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite cathode active material comprising:
   particles, wherein each particle has a core; and
   a single coating layer formed on the core of each particle,
   wherein the single coating layer includes transition metals and the core includes nickel-based lithium transition metal oxide, the single coating layer completely covers the core, and the single coating layer is one body.

2. The composite cathode active material of claim 1, wherein the single coating layer includes cobalt as a main component among said transition metals at about 50% or more.

3. The composite cathode active material of claim 1, wherein the single coating layer has a surface and a concentration of cobalt has a gradient continuously decreasing from the surface of the single coating layer to a center of the core.

4. The composite cathode active material of claim 1, wherein a thickness of the single coating layer is about 100 nm or more.

5. The composite cathode active material of claim 1, wherein the thickness of the single coating layer is in a range of about 200 nm to about 1000 nm.

6. The composite cathode active material of claim 1, wherein an average particle diameter of the core is in a range of about 3 μm to about 30 μm.

7. The composite cathode active material of claim 1, wherein the core is a one-body particle.

8. The composite cathode active material of claim 1, wherein the core is a secondary particle obtained by agglomeration of primary particles.

9. The composite cathode active material of claim 1, wherein the single coating layer includes cobalt.

10. The composite cathode active material of claim 1, wherein the single coating layer includes lithium cobalt oxide.

11. The composite cathode active material of claim 10, wherein the lithium cobalt oxide is $LiCoO_2$.

12. The composite cathode active material of claim 1, wherein the single coating layer comprises a solid solution of nickel-based lithium transition metal oxide and lithium cobalt oxide.

13. The composite cathode active material of claim 1, wherein the nickel-based lithium transition metal oxide has a bulk formula expressed as Chemical Formula 1:

$$Li_xCo_aNi_bM_cO_{2+\alpha} \quad \text{Chemical Formula 1}$$

where $0.9<x<1.5$, $0<a<0.5$, $0<b<1$, $0<c<1$, and $-0.1\leq a\leq 0.1$, and

M is at least one element selected from the group consisting of magnesium (Mg), calcium (Ca), strontium (Sr), barium (Ba), titanium (Ti), zirconium (Zr), niobium (Nb), molybdenum (Mo), tungsten (W), zinc (Zn), aluminum (Al), silicon (Si), manganese (Mn), chromium (Cr), iron (Fe), magnesium (Mg), and vanadium (V).

14. The composite cathode active material of claim 1, wherein the nickel-based lithium transition metal oxide has a bulk formula expressed as Chemical Formula 3:

$$Li_xCo_aNi_bMn_cO_{2+\alpha} \quad \text{Chemical Formula 3}$$

where $0.9<x<1.1$, $0<a<0.5$, $0.4<b<1$, $0<c<0.5$, and $-0.1\leq a\leq 0.1$.

15. A cathode comprising: a current collector; and the composite cathode active material of claim 1 on the current collector.

16. A lithium battery comprising the cathode of claim 15; an anode; and an electrolyte.

* * * * *